Patented May 6, 1947

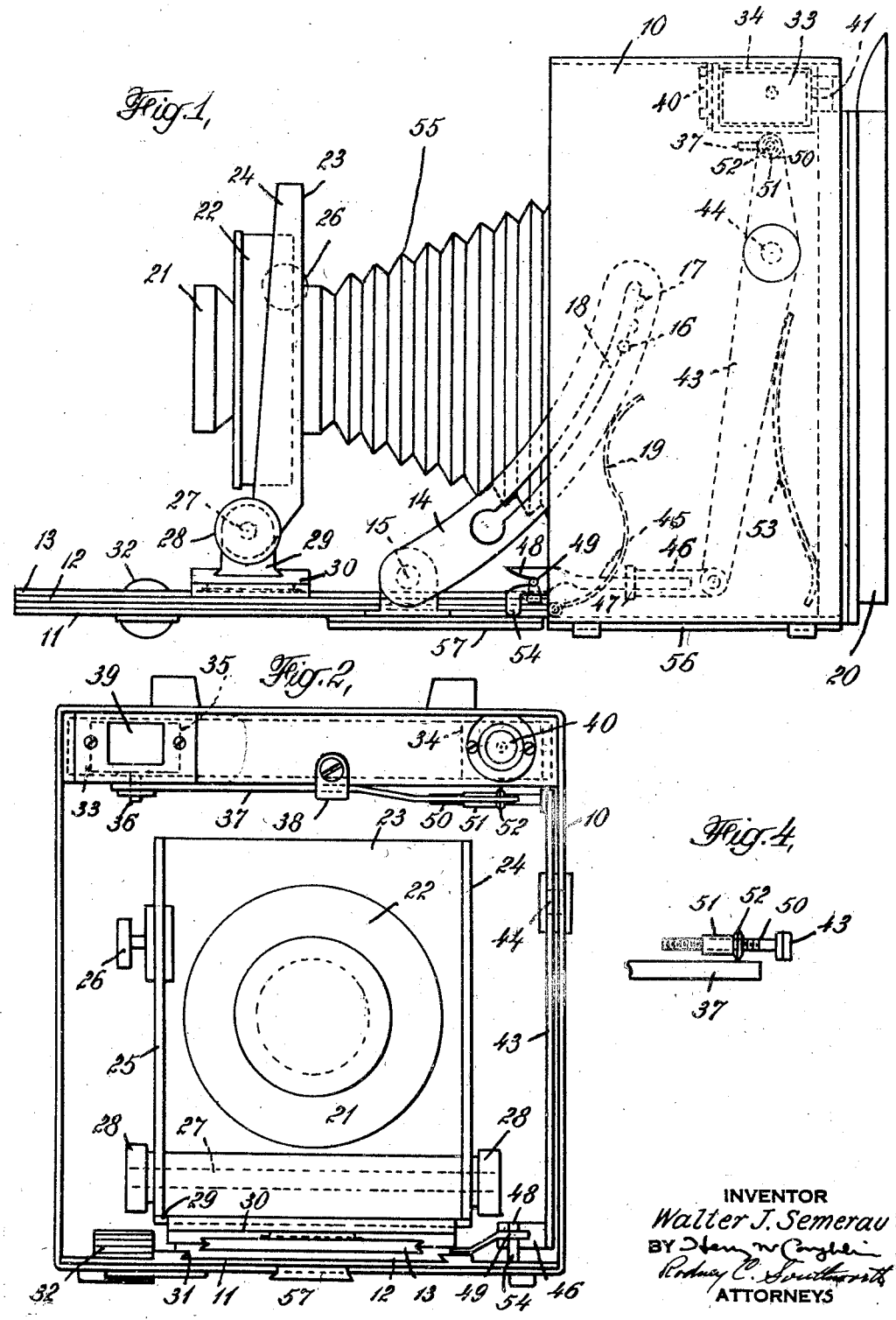

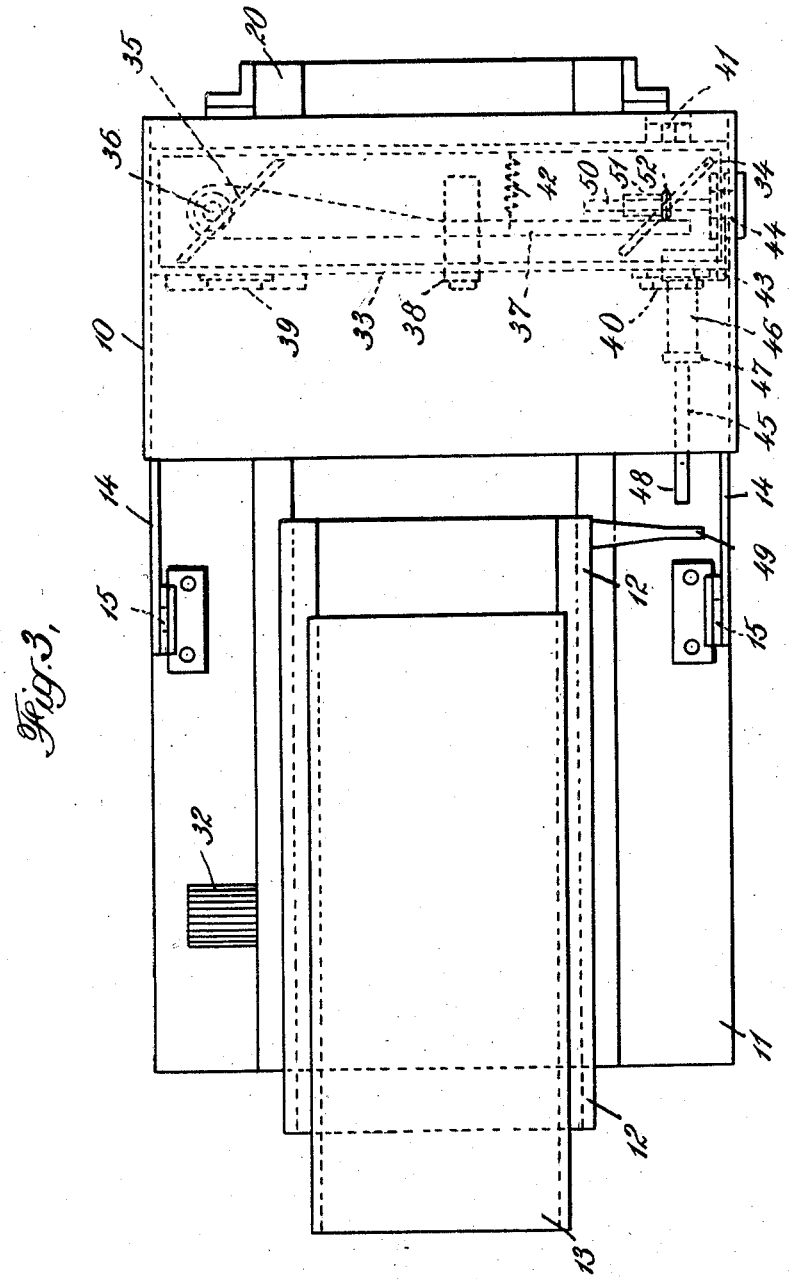

2,420,018

UNITED STATES PATENT OFFICE 2,420,018

RANGE FINDER COUPLING FOR CAMERAS

Walter J. Semerau, Alloy, W. Va., assignor to General Aniline & Film Corporation, New York, N. Y., a corporation of Delaware Application May 3, 1944, Serial No. 533,867

2 Claims. (Cl. 95—44)

This case pertains to an invention in photographic cameras and, more particularly, to certain mechanism applicable to those cameras for focusing by the synchronous operation of a coupled range finder. In many cameras the focusing of the objective is accompanied by or is simultaneously accomplished along with the actuation of a range finder, there being a coupling mechanism of some type between the objective and range finder. In most of those cameras there is no provision for extension of the lens beyond what is generally termed a normal extension or normal operating position.

According to the invention, a range finder of any convenient type is attached to or, more preferably, housed within the camera casing, and that range finder is coupled with the movable bed by means of which the lens is carried when it is extended to active or working position. For any object distance at which the lens may be focused when in normal working position, the coupling mechanism for the lens and range finder functions to maintain those elements in functional coincidence. As the lens is moved forwardly to a position beyond the said normal working position, the coupling mechanism provides for its release and, again, for its recoupling whenever the lens is returned to the usual or normal working range.

An adjustment incorporated into the range finder and lens coupling mechanism provides for initial setting of the range finder so that it may be brought into accurate coincidence with the critical focus of the lens. This adjustment is employed to obtain an initial setting and may be used to compensate for variations in the indicated focal lengths of the particular objectives with which the camera can be fitted. If at any time a different objective is to be used, the adjusting means may be reset, thereby to obtain accurate range finder operation throughout the normal operating range of the substituted lens.

The range finder coupling linkage remains in its connected or coupled position as the lens and bellows are retracted and when the camera bed is raised to close the casing. It also remains coupled and serves its usual and intended function even though the bed is dropped, as is sometimes done with cameras of certain types.

A simplified tripod fitting or connection is provided and this connection relies upon a sliding and frictional grip within the complementary tripod attachment rather than upon threaded connections as are now commonly used.

The invention will be described in detail by reference to the accompanying figures of drawing in which like reference numerals refer to identical parts. In the figures:

Fig. 1 is a side elevation of a camera to which the invention has been applied.

Fig. 2 is a front elevation of the camera illustrated in Fig. 1.

Fig. 3 is a plan view of certain parts of the camera in which details of the range finder, coupling mechanism and the triple extension bed are shown.

Fig. 4 is a detail view of part of the range finder coupling adjusting means.

Now referring to Figs. 1 and 2, the camera itself includes a case 10, a bed 11, which really comprises a swinging bed, an extension 12, and a second extension 13. The bed 11 is hinged at the base of the casing 10 and can be raised or lowered and is maintained in lowered positions by the arms or braces 14 which are pivoted at 15 and engage a pin 16 projecting within the casing 10. The pin 16 may engage any one of a plurality of notches 17 at the lower side of a slot 18 in these braces. A spring 19 for each brace presses it into a position wherein the pin is retained within one of the notches 17 except as it may be disengaged in the usual way whenever it is desired to raise the bed to close the camera case, or to drop the bed as is sometimes done in obtaining special photographic effects.

A back 20 may be of any desired type, but preferably is a revolving back adapted to accommodate plates, cut film, or film packs and has the usual ground glass focusing screen.

A lens 21 is built into a shutter 22 and these elements are carried by a lens board 23 slideable vertically within the lens holder supports 24 and 25. The lens assembly may be raised or lowered and maintained in any desired adjusted elevation by an adjusting knob 26, said knob being connected through to a small gear or pinion which meshes with a rack on the lens board. These elements have not been shown since they are well known to those skilled in the art.

The supports 24 and 25 pivot at 27 and by means of either one of two opposed adjusting knobs 28, the supports may be locked or released and the entire lens assembly tilted forwardly or backwardly as is sometimes done, especially when the lens board is raised or lowered, or when the bed is employed in other than its horizontal position.

The entire lens carrying assembly is also centrally pivoted about a vertical post and may be swung within reasonable limits and maintained in adjusted position by a clamping means.

The base 29 of the lens carrying assembly is provided for sliding laterally in ways in a block 30, and that block is also capable of being slid along the topmost extension 13, and from that into the casing 10 where a corresponding and continuing portion of this extension 13 is fixed. Stops are provided for locating the block 30 at a so-called normal position along the bed 13. That bed also has an indicating pointer or, at least, is indexed in a convenient manner for showing, in cooperation with a scale on the bed 11, at what distance the lens is actually focused. The bed 13 slides within ways or a dovetailed slot in the bed 12 and the two are frictioned sufficiently so that they move together except as it is desired to slide bed 13 forward along the bed 12 to obtain a so-called triple extension. The bed 12 is freely slidable in ways 31 within bed 11. A focusing knob 32 may be turned for changing the position of the beds 12 and 13, and incidentally that of the entire lens assembly along the bed 11. This knob connects by a short shaft or spindle to a small gear which meshes with a rack at the lower side of bed 12. The knob 32 projects above and below the surfaces of bed 11 and is easily turned to effect these focusing movements. A locking means by which any particular setting may be maintained is provided.

The range finder is located within the camera casing and adjacent its top surface or wall. However, it may be located at any convenient position either within or without that casing. As its position is changed, the coupling mechanism would necessarily be altered correspondingly, but the principles herein described would still apply. The invention is not dependent upon any particular range finder, and accordingly the optical principles may be any of those known. That herein shown and described is an exceedingly simple system and includes a range finder housing 33 of such size as to fit within the upper part of the camera case and to afford a range finder base of maximum length. At the left side of this range finder housing is fixed a mirror 34, this being in fact the semi-transparent type of mirror which allows an image to be seen through it and also reflects an image projected upon its surface by a second and movable mirror 35. This mirror 35 is supported on a pivot 36 which has a bearing at the lower part of the housing 33 and is attached for rotation by an arm or lever 37 which extends along the lower side of the housing and is maintained in position adjacent that side or surface by a clip 38.

The range finder also includes a window 39 at its right-hand side through which rays of light from the object being photographed may pass for reflection by the mirror 35 over to the fixed mirror 34. A second window 40 at the lefthand side of the housing allows light from that object to pass through to the mirror 34 and the image of that object will be seen by the photographer as he focuses his vision through an eyepiece 41. The windows are colored so that the image as seen on the semi-transparent mirror 34 will appear of one color and the second image as reflected by movable mirror 35 of another color. When the range finder has been properly set or adjusted to the object distance by swinging arm 37, the reflected image will be superimposed upon the primary image in mirror 34. A spring 42 is under tension and continuously urges the lever 37 toward the back of the housing or camera casing. That spring always assures that the said lever is maintained in contact with the range finder coupling linkage later to be described.

The coupling linkage includes a lever 43 pivoted at 44 to the side of the camera casing and this lever has connected at its lower end a link 45 which is threaded into a connecting clevis 46 within which the link is adjustable, that adjustment being maintained by a lock nut 47. The link 45 is forked at 48 for engagement with a projecting pin 49 which is in turn fixed at the side of the movable bed 12.

This lever 43 transmits motion to the lever 37 through an adjustable knife-edged connection shown in detail in Fig. 4. The lever 43 has permanently attached at its upper end a horizontally extending stud 50 which is threaded throughout its length for reception of a circular, threaded sleeve 51. This sleeve is formed with a circular knife-edged portion 52 which engages the free end of lever 37. The sleeve 51 may be of split type for maintaining itself in any adjusted position along the stud 50, or, alternatively, may have a lock nut (not shown) provided for that purpose. A spring 53, Fig. 1, presses the lever 43 in such a direction that the forked end of link 45 is maintained tightly in contact with pin 49, that is, at least up to the point of maximum extension of the bed for which the range finder may be accurately employed.

The forked end 48 of link 45 rests upon the bed 11 when the objective is moved forwardly to an extent which causes a disconnection of that link with the pin 49. The lower part of the fork is built up as at 54 so that it remains at a level at which the pin will safely be reengaged upon the retraction of the objective. This same result may be obtained by increasing the divergence of the fork, especially the upper part thereof.

A bellows 55 connects at the back of the lens board and continues to the projection plane within the camera. That bellows serves the usual purpose and is of sufficient length to allow the extreme extension of the objective as provided by the movable sections 12 and 13 of the bed.

At the base of the camera case 10 and continuing along the bed 11 are provided the dovetailed strips 56 and 57. When the bed is opened to horizontal position, these strips are in alignment. They are for the purpose of attaching the camera on a tripod or other support and have the advantage of being very quickly inserted in or moved from a cooperating slot on that other element.

Operation

When the camera, including the range finder, has been assembled, initial adjustments are made so as to bring the range finder into proper adjustment for the particular lens or objective with which it is to be employed. The objective is moved to the so-called normal position on the movable bed by checking the image focused on the ground glass while that bed is in its rearmost or non-extended position, that is, the infinity position. Then by means of the adjustment provided between the link 45 and clevis 46, the range finder may be set so that a distant object (one at more than 100 feet) will be seen through the eyepiece as a single image. In other words, the reflected image of that object will be seen exactly superimposed upon the image of the object viewed directly through mirror 34 and window 40.

The lens or objective is then racked forwardly to that position in which it will be focused on an object at the minimum object distance for which it is designed. Then if the reflected and the direct image, as viewed in the eyepiece of the range finder, do not coincide, the knife-edged contact element 52 is turned along the stud 50 until those images are in coincidence.

The adjustment above described is preferably to be rechecked, and may be checked at intermediate points. However, if the two functions are adjusted in synchronism at the opposite extremes, the variation at intermediate points may be disregarded.

When the camera is to be closed, the block 30 is pushed along its slides until it has been retracted to its rearmost position within the casing. Then, by slight pressure on the arms 14, they are released and the bed may be swung upwardly to closed position. Of course, there is a spring catch for holding it there. The design and proportion of the coupling linkage is such that this closing movement of the bed swings the lever 43 toward the back of the camera farther than it would be moved during its normal operation. However, the overtravel of that lever, lever 37, and the extra movement imparted to the movable mirror, have no undesired effect, and upon opening the camera bed, those parts will return to infinity position (assuming the movable bed 12 is fully retracted as it must be when the bed is closed). The bed 12 may also be dropped as provided by the additional notches 17, but the functioning of the range finder will not be disturbed. That swinging movement does bring about a slight disturbance of the centers or points about which the various elements work, but not enough to have any appreciable effect upon its accuracy.

*Summary*

The invention has been described by reference to one specific embodiment thereof which has been applied to a press type camera. It is to be understood that it is by no means applicable to that type of camera only, but may be employed in practically all cameras so long as there is a focusing movement of some type as applied to the objective and a range finder in attachment with the camera to which the focusing movement of the objective is connected. The range finder, as before stated, may be constructed along any optical principles known and may be mounted as a unitary part of the camera, or may be in the nature of an attachment thereto. The interconnecting linkage between the range finder and objective may be attached directly to the latter or, as in the example of this press type camera, may be connected for operation through the lens-supporting bed which moves to provide retraction and extension of the objective and its bellows.

The interconnecting linkage may take other forms than that herein illustrated so long as the principles of the invention are applied. Rather than resorting to the use of levers, cams or gears may be employed at some one or more points, especially if range finders are to be used which employ other optical principles than that of a pivoting mirror.

The invention is by no means dependent on the particular objective, shutter, or the type of film holder or film to be used, and in fact, the coupling may as well be applied in instances where objectives are installed, those objectives being of a type in which the focusing is effected by rotation of the lens barrel or other lens support, rather than by a sliding movement of the camera bed. In that event, the lens may be focused in any of the known ways and its movement then conveyed to the interconnecting linkage leading to the movable element or elements of the range finder. The same principles as herein described will apply.

According to the design of this particular range finder, it is to be employed as a range finder only, or for assuring critical focus of the lens, while the photographer then resorts to any one of the usual view finders (not shown). Of course the window 40 may be changed in shape and the range finder may then become a view finder, in which event the other view finders with which the camera may be provided will be used only on special occasions.

The invention is not to be limited except by the scope of the appended claims.

I claim:

1. In a photographic camera the combination of an adjustably mounted lens, a range finder having at least one adjustably mounted reflector, and means for coupling said lens to said range finder and for providing an adjustment whereby said range finder may be employed for accurately determining the range while focusing with lenses of different focal lengths, which comprises two levers movable in planes disposed at substantially a right angle, one said lever having operative connection to the movable reflector and the other having connecting means by which it is attached for movement with the lens as the latter is focused, and means for transmitting movement of the second lever to the first comprising a knife-edged contact member threaded to an extension projecting at right angles from the second lever and adjustable along said threaded extension to bear on said first lever at different points along the length thereof, thereby to vary the ratio of movement of the reflector as compared to the focusing movement of the lens by varying the effective length of the first lever only.

2. In a photographic camera the combination of an adjustably mounted lens, a range finder having at least one adjustably mounted reflector, and means for coupling said lens to said range finder and for providing an adjustment whereby said range finder may be employed for accurately determining the range while focusing with lenses of different focal lengths, which comprises two levers movable in planes disposed at substantially a right angle, one said lever having operative connection to the movable reflector and the other having connecting means by which it is attached for movement with the lens as the latter is focused, and means for transmitting movement of the second lever to the first comprising an extension projecting at right angles to the second lever and parellel to the first and a member having a knife-edged contact surface carried by the extension and adjustable along the length thereof for contacting the first lever so that the ratio of movement of the reflector to that of the lens may be varied by varying the effective length of the first lever only.

WALTER J. SEMERAU.

REFERENCES CITED

The following references are of record in the file of this patent:

UNITED STATES PATENTS

| Number | Name | Date |
|---|---|---|
| 2,185,377 | Liebmann | Jan. 2, 1940 |
| 2,225,596 | Schwartz et al. | Dec. 17, 1940 |
| 2,229,855 | Liebmann | Jan. 28, 1941 |
| 2,305,437 | Meyers et al. | Dec. 15, 1942 |
| 1,972,000 | Warner | Aug. 28, 1934 |
| 2,351,386 | Zucker | June 13, 1944 |
| 1,357,639 | Kroedel | Nov. 2, 1920 |
| 2,302,584 | Steiner | Nov. 17, 1942 |
| 1,178,474 | Becker | Apr. 4, 1916 |
| 1,561,630 | Wilson | Nov. 17, 1925 |
| 1,151,635 | Webb | Aug. 31, 1915 |